Jan. 27, 1953

J. R. MOORE

RELAXATION OSCILLATOR

Filed Nov. 27, 1946

2,627,031

Inventor
James R. Moore

By
C. D. Tuska
Attorney

Patented Jan. 27, 1953

2,627,031

UNITED STATES PATENT OFFICE 2,627,031

RELAXATION OSCILLATOR

James R. Moore, Washington, D. C., assignor to Radio Corporation of America, a corporation of Delaware Application November 27, 1946, Serial No. 712,553

6 Claims. (Cl. 250—36)

Figures 1, 2, 3, 4:
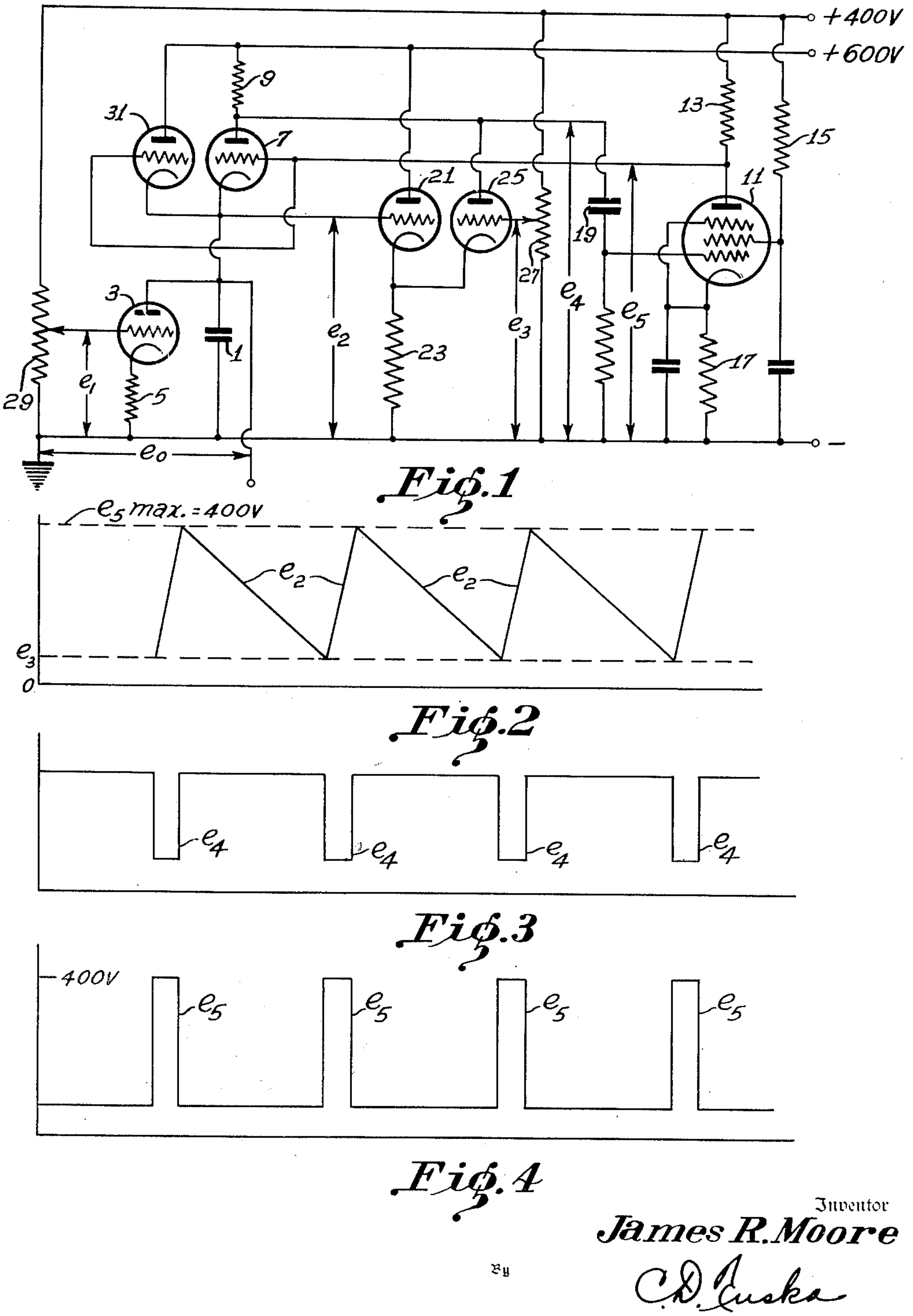

This invention relates to relaxation oscillators such as are used in sawtooth wave generators and the like, and more particularly to relaxation oscillators wherein the frequency of oscillation is controlled by adjustment of a voltage applied thereto.

One of the objects of the invention is to provide a voltage controlled relaxation oscillator whose frequency of operation is substantially independent of ordinary variations in tube characteristics.

Another object is to provide an oscillator of the described type whose frequency may be varied throughout a wide range without variation in output amplitude.

The invention will be described with reference to the accompanying drawing, wherein:

Figure 1 is a schematic circuit diagram of a relaxation oscillator embodying the invention, Figure 2 is an oscillogram showing the output wave provided by the oscillator of Figure 1, and Figures 3 and 4 are further oscillograms of voltages appearing at certain points in the circuit of Figure 1 during its operation.

Ordinarily, a relaxation oscillator includes a storage device, such as a capacitor, which is charged at a relatively slow rate during the major portion of each cycle, and discharges as nearly instantaneously as possible when the charge reaches a predetermined value. The charge-discharge cycle recurs at a frequency determined primarily by the charging rate. The present oscillator differs from such prior art devices in that the charging occurs substantially instantaneously, and the repetition frequency is controlled by adjustment of the rate of the discharge.

Referring to Figure 1, a capacitor 1 is shunted by an electron discharge tube 3. A resistor 5 is included in the cathode circuit of the tube 3 to cause the tube 3 to act as a substantially constant current device, as described hereinafter. The capacitor 1 is connected through an electron discharge tube 7 and a resistor 9 to a D.-C. supply source having a potential of, for example, 600 volts. The control grid of the tube 7 is connected to the anode of a tube 11, which may be of the pentode type. The tube 11 is provided with a load resistor 13, and with screen grid and cathode bias resistors 15 and 17 respectively. The anode supply for the tube 11 is lower than that of the tube 7, being for example 400 volts. The control grid of the tube 11 is coupled through a capacitor 19 to the anode of the tube 7.

The upper terminal of the storage capacitor 1 is connected to the control grid of a tube 21. The tube 21 is arranged as a cathode follower with its anode connected directly to the positive terminal of the D.-C. supply (600 volts in the present example), and with a load resistor 23 in its cathode circuit. A further tube 25 is provided with its cathode connected to that of the tube 21 and its anode connected to the anode of the tube 7. The control grid of the tube 25 is biassed from a tap on a voltage divider 27, connected across the D.-C. supply.

The voltage at the control grid of the tube 3 determines the frequency of operation of the oscillator as will be explained hereinafter. In the present illustration, this voltage is provided by an adjustable voltage divider 29 connected across the 400 volt supply.

An additional tube 31 is included, with its control grid and cathode tied to the corresponding elements of the tube 7, and its anode connected directly to the positive high voltage supply terminal.

The adjustment and operation of the described circuit is as follows:

The voltage divider 27 is set to provide a bias $e_3$ at the control grid of the tube 25. Let us assume that the capacitor 1 has already been charged through the tubes 7 and 31, to a voltage greater than $e_3$. As a result of the cathode follower action of the tube 21, the voltage at the cathode of the tube 25 is likewise greater than $e_3$, hence the tube 25 is cut off.

The capacitor 1 discharges through the tube 3 at a rate depending upon the value of $e_1$. The grid-to-cathode voltage on the tube 3 is the difference between $e_1$ and the drop in the resistor 5. The tube 3 conducts enough to maintain this difference small. Thus the current through the resistor 5, and hence the discharge rate, is substantially independent of ordinary variations in the characteristics of the tube 3, and is practically constant for a constant value of $e_1$. The voltage $e_2$ across the capacitor 1 decreases, as shown by the downwardly sloping portions of the curve of Figure 2, until $e_2$ is slightly less than the bias $e_3$. At this point, the cathode of the tube 25 is no longer positive with respect to the grid, and the tube 25 starts to conduct. The current flows through the resistor 9, reducing the voltage $e_4$ at the anodes of tubes 7 and 25. See Figure 3. The drop in potential is applied through the capacitor 19 to the tube 11, cutting off the tube 11 and allowing the voltage $e_5$ at its anode to increase to the level of the 400 volt supply, as illustrated in Figure 4. The voltage $e_5$ is applied directly to the control grid of the tube 7, causing it to conduct because $e_5$ is higher than the potential (substantially $e_3$) at the cathode of the tube 7.

Since the grid-cathode circuit of the tube 31 is in parallel with that of the tube 7, the tube 31 will conduct also at this time. Current flows through the tubes 31 and 7 from the 600 volt source to the capacitor 1, charging it rapidly until the voltage $e_2$ at the cathodes of the tubes 31 and 7 exceeds the voltage $e_5$ at the control grids, i. e. about 400 volts. This is illustrated by the upwardly extending portions of the curve of Figure 2. During the charging period, the voltage drop in the resistor 9 holds the voltage $e_4$ at a relatively low level. (Figure 3.)

When the tubes 31 and 7 stop conducting, the voltage $e_4$ rises, causing the tube 11 to start conducting. This reduces the voltage $e_5$, keeping the tube 7 (and with it the tube 31) cut off until $e_2$ again decreases to the bias level $e_3$.

The charging portion of the cycle is very rapid, since the principal limitation on the charging rate is the minimum resistance of the tube 31. Thus the major portion of each cycle is occupied by the discharge through the tube 3, and the frequency depends substantially only upon the discharge rate.

The discharge time is a function of the current through the tube 3 and resistor 5, the capacitance C of the capacitor 1, and the difference between the maximum and minimum values of the voltage $e_2$ across the capacitor 1. The upper and lower limits of $e_2$ must be maintained constant if the frequency is to be controlled solely by the adjustment of the voltage $e_1$. It is evident from the foregoing description that the lower limit of $e_2$ is set definitely by the bias $e_3$. Ordinary variations in the characteristics of the tubes 21 and 25 will have substantially no effect on the cathode follower action.

The upper limit of $e_2$ is set by the maximum value of $e_5$. This depends substantially only on the power supply voltage (which can be closely regulated), because the tube 11 is cut off when $e_2$ is at its peak. Similarly, the tubes 7 and 31 are always operating either at cutoff or saturation, where the effects of variations in characteristics are at a minimum.

I claim as my invention:

1. A self-oscillatory relaxation oscillator including a capacitor and means for discharging said capacitor at a predetermined rate; two electron discharge tubes, each including at least an anode, a cathode, and a control grid, and means coupling the anode of each of said tubes to the control grid of the other, whereby conduction through either of said tubes prevents conduction through the other; a direct current source connected through the anode to cathode path of the first of said tubes to said capacitor, whereby conduction through said first tube charges said capacitor; means responsive to the voltage across said capacitor to stop conduction through said first tube and initiate conduction through said second tube when said voltage reaches a predetermined upper level, and means responsive to the voltage across said capacitor to stop conduction through said second tube and initiate conduction through said first tube when said capacitor is discharged to a predetermined lower voltage level.

2. A self-oscillatory relaxation oscillator including a capacitor that is to be discharged during discharging periods and charged during charging periods, means for continuously discharging said capacitor between charging periods, means for cyclically charging said capacitor including a direct current source and an electron discharge tube with its space path connected between said source and said capacitor, and means for controlling the flow of current through said tube, said means including a cathode follower circuit responsive to the voltage across said capacitor and comprising a second electron discharge tube with its anode connected directly to said direct current source and a load resistor connected between its cathode and said source, a third tube with its anode connected to that of said first tube and its cathode connected to the cathode of said second tube, means providing a predetermined potential at the control grid of said third tube whereby conduction through said third tube occurs only upon discharge of said capacitor below a predetermined voltage level, a fourth tube with its anode coupled to the control grid of said first tube and its control grid coupled to the anodes of said first and third tubes, whereby conduction through said third tube stops conduction through said fourth tube, initiating conduction through said first tube, and cessation of conduction through said first tube initiates conduction through said fourth tube to maintain said first tube non-conducting as long as the voltage across said capacitor is above said predetermined level.

3. A self-oscillatory relaxation oscillator including a capacitor and means for comparatively slowly discharging said capacitor, means comprising a charging circuit for charging said capacitor, means associated with said charging circuit for providing a predetermined lower limit voltage therefor, means responsive to the voltage across said capacitor to initiate comparatively rapid charging of said capacitor through said charging circuit when said capacitor voltage decreases to said predetermined lower limit voltage, means associated with said charging circuit for providing a predetermined upper limit voltage, and means responsive to the voltage across said capacitor to stop said charging when said capacitor voltage reaches said predetermined upper limit voltage and to initiate said discharging of said capacitor.

4. A self-oscillatory relaxation oscillator including a capacitor and means for comparatively slowly discharging said capacitor, said means including an electron discharge tube with its space path connected across said capacitor and means controlling the internal resistance of said tube to maintain substantially constant current therethrough; means responsive to the voltage across said capacitor to initiate comparatively rapid charging of said capacitor when said voltage decreases to a predetermined minimum, and means responsive to the voltage across said capacitor to stop said charging when said voltage reaches a predetermined maximum and to initiate said discharging of said capacitor.

5. A self-oscillatory relaxation oscillator including a capacitor and means for discharging said capacitor, means comprising a charging circuit for charging said capacitor, means associated with said charging circuit for providing a predetermined lower limit voltage therefor, means responsive to the voltage across said capacitor to initiate charging of said capacitor through said charging circuit when said capacitor voltage decreases to said predetermined lower limit voltage, means associated with said charging circuit for providing a predetermined upper limit voltage, and means responsive to the voltage across said capacitor to stop said charging when said capacitor voltage reaches said predetermined upper limit voltage and to initiate said discharging of said capacitor.

6. A self-oscillatory relaxation oscillator including a capacitor and means for discharging said capacitor, means providing a predetermined lower limit bias voltage, means responsive to the voltage across said capacitor to initiate charging of said capacitor when said capacitor voltage decreases to said predetermined lower limit bias voltage, said last-mentioned means including a first electron discharge tube having an anode and having input electrodes comprising a cathode and a control grid, and further including means applying said lower limit bias voltage to one input electrode of said first tube and means effectively applying to the other input electrode of said first tube the voltage appearing on the terminal of said capacitor at which terminal the voltage changes with respect to said lower limit bias voltage during discharging of the capacitor, means providing a predetermined upper limit voltage, means responsive to the voltage across said capacitor to stop said charging when said capacitor voltage reaches said predetermined upper limit voltage and to initiate said discharging of said capacitor, said last means including a second electron discharge tube having an anode and having input electrodes comprising a cathode and a control grid, and further including means applying said upper limit voltage to one input electrode of said second tube as said capacitor is being charged and means connecting the other input electrode of said second tube to the terminal of said capacitor at which the voltage changes with respect to said upper limit voltage during charging of the capacitor.

JAMES R. MOORE.

REFERENCES CITED

The following references are of record in the file of this patent:

UNITED STATES PATENTS

| Number | Name | Date |
|---|---|---|
| 2,155,210 | Young | April 18, 1939 |
| 2,248,975 | Faudell | July 15, 1941 |
| 2,265,290 | Knick | Dec. 9, 1941 |
| 2,414,486 | Rieke | Jan. 21, 1947 |
| 2,448,069 | Ames, Jr. et al. | Aug. 31, 1948 |
| 2,448,070 | Sunstein | Aug. 31, 1948 |